(12) United States Patent
Uchida et al.

(10) Patent No.: US 7,978,470 B2
(45) Date of Patent: Jul. 12, 2011

(54) ELECTRONIC APPARATUS

(75) Inventors: Hiroki Uchida, Kawasaki (JP); Jun Taniguchi, Kawasaki (JP); Hideshi Tokuhira, Kawasaki (JP); Minoru Ishinabe, Kawasaki (JP); Masanobu Ishiduka, Kawasaki (JP); Hiroaki Date, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/251,172

(22) Filed: Oct. 14, 2008

(65) Prior Publication Data

US 2009/0052135 A1    Feb. 26, 2009

Related U.S. Application Data

(62) Division of application No. 11/085,483, filed on Mar. 22, 2005, now Pat. No. 7,502,227.

(30) Foreign Application Priority Data

Dec. 17, 2004  (JP) ................................. 2004-366484

(51) Int. Cl.
    *H05K 7/20* (2006.01)
(52) U.S. Cl. .............. 361/699; 361/679.53; 361/679.46; 165/80.4
(58) Field of Classification Search .................. 361/699, 361/679.01, 679.08, 679.09, 679.21, 679.26–679.27, 361/679.46–679.55, 688, 689, 694, 696, 361/698, 700, 701, 704, 712, 713; 165/80.4, 165/104.33, 122–126; 257/706–727
See application file for complete search history.

(56) References Cited

U.S. PATENT DOCUMENTS

| | | | |
|---|---|---|---|
| 4,850,201 A * | 7/1989 | Oswalt et al. | 62/185 |
| 5,383,340 A | 1/1995 | Larson et al. | |
| 5,435,379 A * | 7/1995 | Moslehi et al. | 165/80.4 |
| 6,181,555 B1 | 1/2001 | Haley et al. | |
| 6,711,017 B2 * | 3/2004 | Kurokawa et al. | 361/699 |
| 6,833,992 B2 | 12/2004 | Kusaka et al. | |
| 7,131,486 B2 | 11/2006 | Goodson et al. | |
| 2003/0016498 A1 * | 1/2003 | Kurokawa et al. | 361/699 |
| 2004/0114324 A1 | 6/2004 | Kusaka et al. | |
| 2005/0180109 A1 * | 8/2005 | Miyazaki et al. | 361/700 |
| 2006/0005549 A1 | 1/2006 | Ishinabe et al. | |

FOREIGN PATENT DOCUMENTS

| | | |
|---|---|---|
| JP | 63015318 | 1/1988 |
| JP | 63-145395 | 9/1988 |
| JP | 4329698 | 11/1992 |
| JP | 11-354951 A | 12/1999 |

(Continued)

*Primary Examiner* — Jayprakash N Gandhi
*Assistant Examiner* — Ingrid Wright
(74) *Attorney, Agent, or Firm* — Arent Fox LLP

(57) ABSTRACT

A body flow path in a first housing having an MPU element communicates with an inner flow path and outer flow path formed in an inner heat-dissipating board and an outer heat-dissipating board, respectively, and a pump drives a cooling liquid to circulate in these flow paths. A beam is arranged between a pivot provided in a second housing and a pivot provided in the inner heat-dissipating board, a beam is arranged between the pivot of the inner heat-dissipating board and a pivot provided in the outer heat-dissipating board, and the inner heat-dissipating board and the outer heat-dissipating board are movable to the second housing. According to the operation of opening the second housing, a distance between the second housing and the inner heat-dissipating board, and a distance between the inner flow path and the outer flow path are increased.

2 Claims, 16 Drawing Sheets

FOREIGN PATENT DOCUMENTS

| | | |
|---|---|---|
| JP | 2001280774 | 10/2001 |
| JP | 2002-16200 A | 1/2002 |
| JP | 2002-163042 A | 6/2002 |
| JP | 2002372360 | 12/2002 |
| JP | 2002373034 | 12/2002 |
| JP | 2003-22148 A | 1/2003 |
| JP | 2003-133773 A | 5/2003 |
| JP | 2004-95891 A | 3/2004 |
| JP | 2004-111829 A | 4/2004 |
| JP | 2004-349626 A | 12/2004 |

* cited by examiner

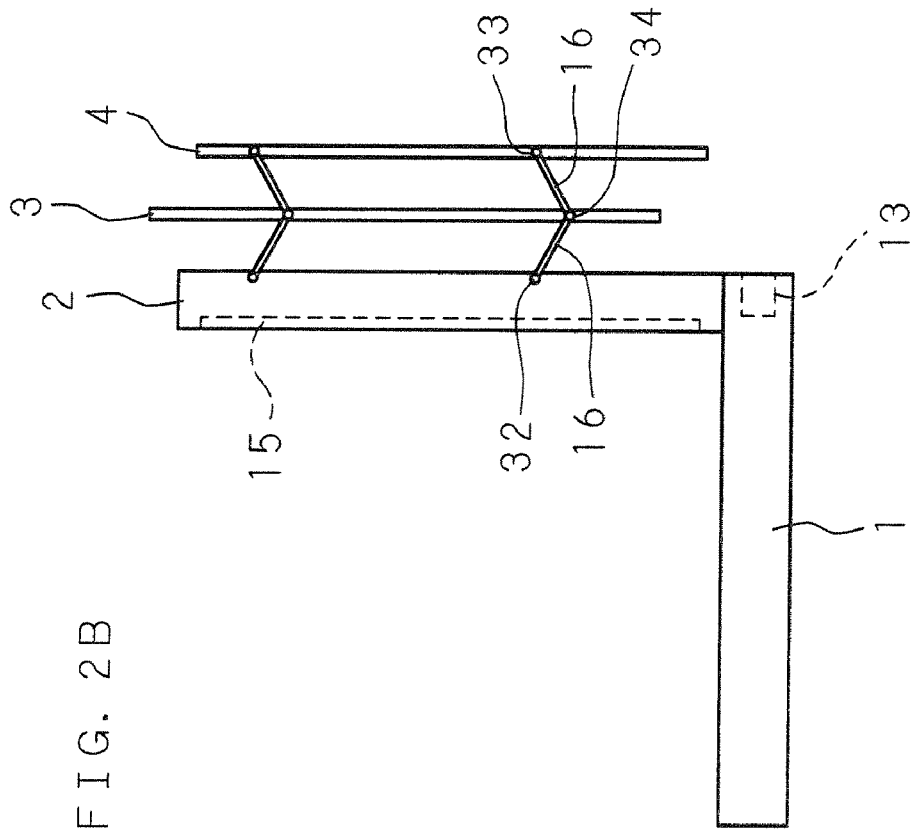
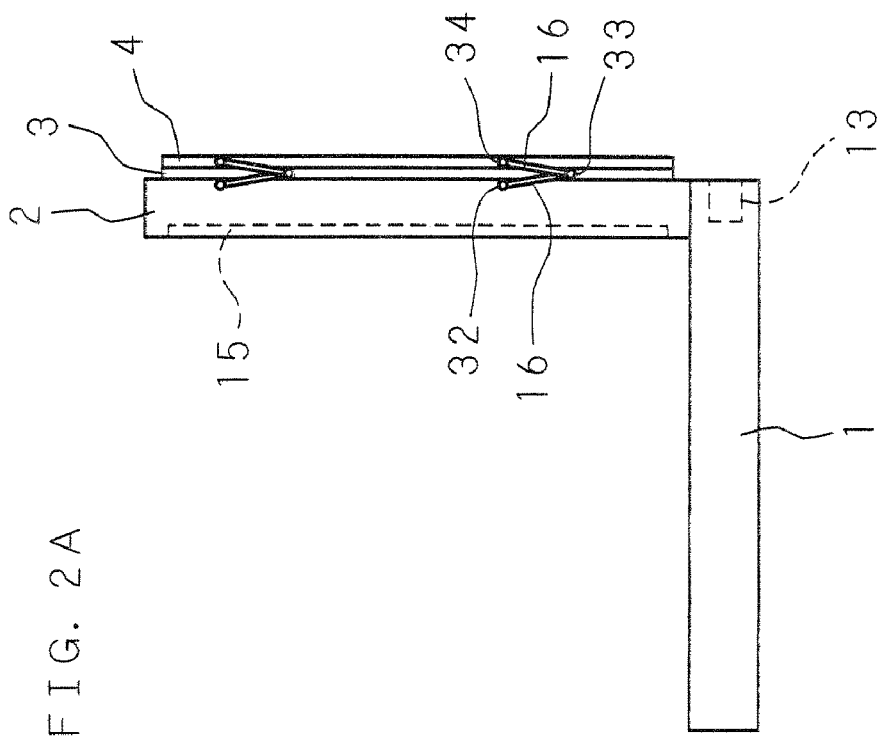

ELECTRONIC APPARATUS

CROSS-REFERENCE TO RELATED APPLICATIONS

This application is a divisional of application Ser. No. 11/085,483, filed Mar. 22, 2005, which is a Nonprovisional application that claims priority under 35 U.S.C. §119(a) on Patent Application No. 2004-366484 filed in Japan on Dec. 17, 2004, the entire contents of which are hereby incorporated by reference.

BACKGROUND OF THE INVENTION

The present invention relates to an electronic apparatus that performs heat dissipation treatment using a circulating cooling liquid.

An electronic apparatus, such as a desktop type computer, a notebook type computer, and a mobile communication device, is provided with a microprocessor (MPU). In recent years, with an improvement in processing speed of the microprocessor, and enhancement features and advanced performances of the microprocessor, there is an increasing tendency in heating value during operation. In order for the microprocessor to maintain stable operation, generated heat must be quickly discharged to the outside to thereby increase heat dissipation efficiency.

For that reason, an electronic apparatus provided with an air-cooled cooling device for cooling the microprocessor is generally used. This cooling device includes a heat sink that takes and dissipates heat of the microprocessor, and a cooling fan that sends a cooling airflow to this heat sink. Since the heating value of the microprocessor has possibly been increased continuously as mentioned above, a countermeasure for solving the problem has been required.

In the air-cooled cooling device, in order to improve a cooling capability, countermeasures, such as large-sizing of the heat sink, a performance improvement of the cooling fan, or the like are taken. However, when using a large-sized heat sink, there may arise a problem that a large-sized electronic apparatus is also required in order for the heat sink to be incorporated therein. Meanwhile, in order to achieve a performance improvement of the cooling fan, large-sizing of a fan structure, an increase in a rotational frequency of the cooling fan, or the like is required, but there may arise a problem that this technique cannot prevent the electronic apparatus from being large-sized or a fan noise from being increased. Particularly, in a notebook type computer, in addition to the cooling capability, portability, that is, the size and weight of the apparatus will become an important factor, and silence, that is to say, the apparatus works quietly during operation will also be an essential factor, but the countermeasures for improving the cooling capability described above are contradictory to those.

Therefore, there has been proposed a cooling system of liquid-cooling type that utilizes as a coolant a liquid, such as water having a specific heat far higher than that of air (for example, refer to Japanese Patent Application Laid-Open No. 2004-95891 and Japanese Patent Application Laid-Open No. 2004-111829). According to the cooling system, a heat reception portion is provided near a microprocessor housed in a housing, a heat dissipation portion is housed in a display unit, a circulation path which circulates a liquid coolant between the heat reception portion and the heat dissipation portion is provided, and heat of the microprocessor having transmitted to the heat reception portion is transported to the heat dissipation portion via the coolant which flows through the circulation path.

Moreover, various kinds of electronic apparatuses which are devised to increase the heat dissipation efficiency have been proposed (for example, refer to Japanese Patent Application Laid-Open No. 2002-16200 and Japanese Patent Application Laid-Open No. 11-354951 (1999)). In the Japanese Patent Application Laid-Open No. 2002-16200, there is described an electronic apparatus configured so that a fin of a heat dissipation member which is thermally coupled to electronic parts housed in an apparatus housing may be increased or reduced in conjunction with an open/close operation of a cover body. In the Japanese Patent Application Laid-Open No. 11-354951, a portable electronic apparatus configured so that the heat dissipation portion may freely protrude from the housing is disclosed.

As for the notebook type computer, not only enhancement featured and advanced performances of the microprocessor, but also miniaturization and portability are also highly required. Efficient heat dissipation treatment in limited room is therefore desired for a possible increase of the heating value.

BRIEF SUMMARY OF THE INVENTION

The present invention has been made in view of the situation described above, and it is an object of the present invention to provide an electronic apparatus which can efficiently perform heat dissipation treatment even when having a compact configuration, by freely movably providing a plurality of heat dissipation portions having flow paths for circulating a cooling liquid.

Another object of the present invention is to provide an electronic apparatus that can efficiently perform the heat dissipation treatment even when having a compact configuration, by controlling a flow rate of the cooling liquid flowing through the flow path which each of the plurality of heat dissipation portions has.

There is provided an electronic apparatus according to the present invention including a main body portion that generates heat and a cover body portion that covers the main body portion, and discharging the heat generated in the main body portion to the outside with a cooling liquid, wherein a plurality of heat dissipation portions having flow paths of the cooling liquid are provided in the cover body portion, and a distance between the cover body portion and the heat dissipation portion, and a distance between the adjacent heat dissipation portions are variable. According to the electronic apparatus configured as above, the plurality of heat dissipation portions having flow paths of the cooling liquid are provided at the backside of the cover body portion, so that a heat dissipation area is increased to thereby increase heat dissipation efficiency. Moreover, by making these heat dissipation portions to be movable, the distance between the cover body portion and the heat dissipation portion, and the distance between the adjacent heat dissipation portions are variable, so that air is made to flow between the cover body portion and the heat dissipation portion, and between adjacent heat dissipation portions, thereby making it possible to obtain a large heat dissipation effect. Since the plurality of heat dissipation portions having the flow paths of the cooling liquid are freely movably provided in the cover body portion, it is possible to efficiently perform the heat dissipation treatment even when having a compact configuration.

The electronic apparatus according to the present invention can change a distance between the cover body portion and the heat dissipation portion, and a distance between the adjacent heat dissipation portions. According to the electronic apparatus configured as above, when the cover body portion is opened, the distance between the cover body portion and the heat dissipation portion and the distance between adjacent heat dissipation portions are increased to thereby obtain the large heat dissipation effect, and when the cover body portion is closed, those distances are reduced to thereby house the plurality of heat dissipation portions therein compactly. Since according to an open/close operation of the cover body portion, the large heat dissipation effect is obtained when opened, and the heat dissipation portions are housed compactly when closed, it is possible to efficiently perform the heat dissipation treatment even when having a compact configuration.

The electronic apparatus according to the present invention includes a controlling unit that controls the distance between the cover body portion and the heat dissipation portion, and the distance between the adjacent heat dissipation portions. According to the electronic apparatus configured as above, the distance between the cover body portion and the heat dissipation portion, and the distance between the adjacent heat dissipation portions are controlled by the controlling unit. Therefore, those distances can be set to desired distances, and the heat dissipation efficiency is adjusted according to a situation. In this case, when the controlling unit is driven in an on-state in detecting an open of the cover body portion, the heat dissipation effect is performed automatically according to the time of generating the heat in the main body portion. Moreover, in this case, when controlling the operation of the controlling unit and adjusting a heat dissipation characteristic based on a temperature of a predetermined portion (cover body portion, main body portion, or the like) of the electronic apparatus, suitable heat dissipation treatment according to the temperature situation can be performed.

There is provided an electronic apparatus according to the present invention having a main body portion that generates heat and discharging the heat generated in the main body portion to the outside with a cooling liquid, comprising a plurality of heat dissipation portions that have flow paths of the cooling liquid in a mode of communicating with each other in parallel or in series, and a controlling unit that controls a flow rate of the cooling liquid flowing through the flow path which each of the plurality of heat dissipation portions has. According to the electronic apparatus configured as above, the flow rate of the cooling liquid flowing through the flow path of each of the plurality of heat dissipation portions that are communicated in parallel or in series is controlled by the controlling unit. Therefore, that makes it possible to provide a large heat dissipation area and a high cooling capacity, and exhibit an efficient heat dissipation characteristic.

In the electronic apparatus which controls the flow rate of the cooling liquid flowing through the flow path, when controlling the flow rate of the cooling liquid based on a temperature of a predetermined portion (main body portion, heat dissipation portion, or the like) of the electronic apparatus, suitable heat dissipation treatment according to the temperature situation can be performed.

The above and further objects and features of the invention will more fully be apparent from the following detailed description with accompanying drawings.

BRIEF DESCRIPTION OF THE SEVERAL VIEWS OF THE DRAWINGS

FIGS. 2A and 2B are views showing movements of an inner heat-dissipating board and an outer heat-dissipating board in the electronic apparatus according to the present invention;

DETAILED DESCRIPTION OF THE INVENTION

Figure 1:
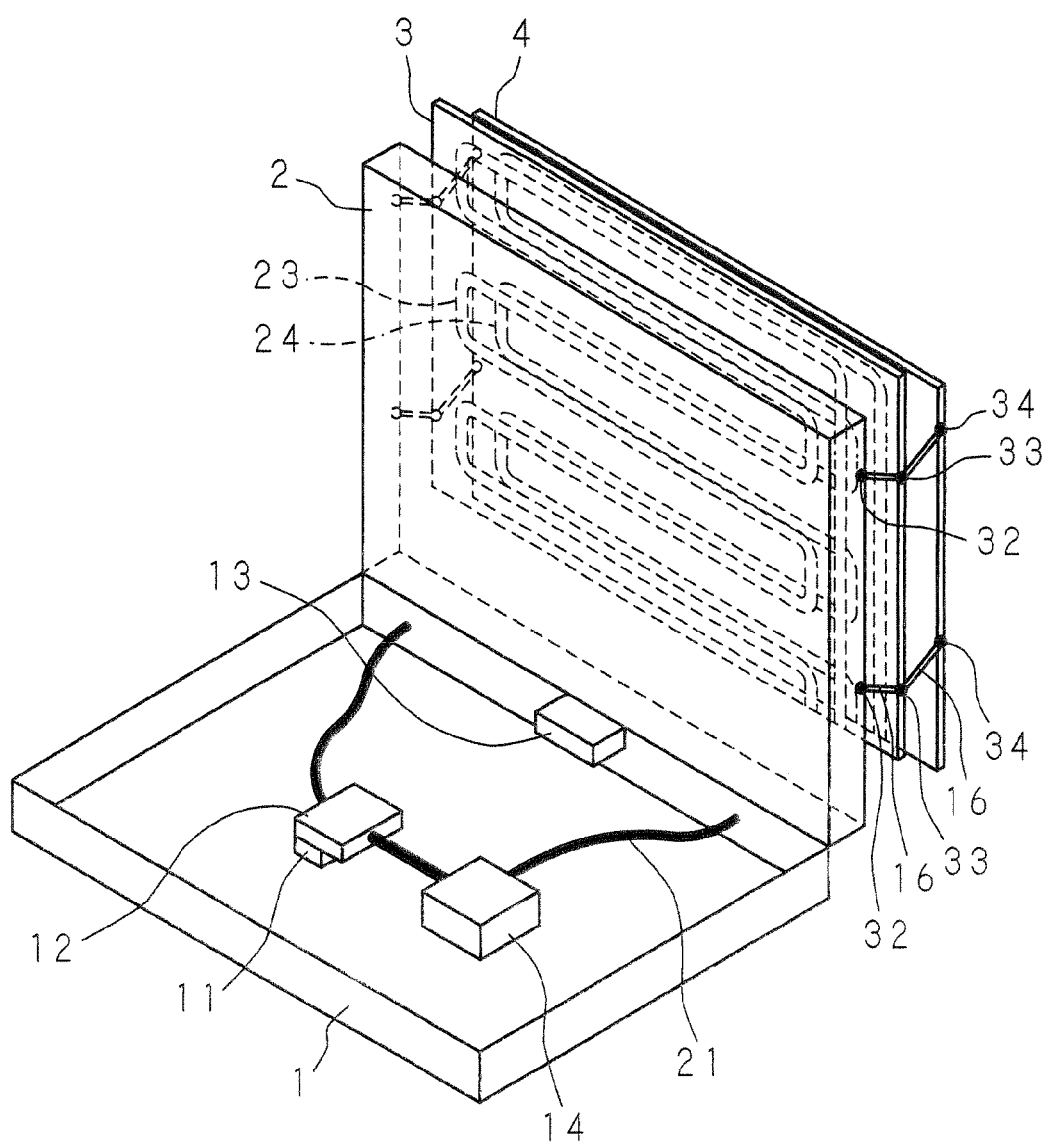
FIG. 1 is a perspective view showing an electronic apparatus (notebook type computer) according to the present invention.

Hereafter, the present invention will specifically be explained with reference to the drawings. FIG. 1 is a perspective view of a notebook type computer being used for an electronic apparatus according to the present invention.

In FIG. 1, the electronic apparatus of the present invention includes a housing 1 (hereinafter, referred to as a first housing 1) at a side of a main body portion, a housing 2 (hereinafter, referred to as a second housing 2) at a side of a cover body portion, and two heat-dissipating boards 3 and 4 (hereinafter, referred to as an inner heat-dissipating board 3 and an outer heat-dissipating board 4) as a plurality of heat dissipation portions provided at a backside of the second housing 2. The second housing 2 can be freely opened and closed to the first housing 1.

A heat-receiving board 12 is provided in the first housing 1 corresponding particularly to an MPU element 11 as a heat-radiating component with a large heating value. In the first housing 1, a fan 13 that sends out air for cooling is also provided between the second housing 2 and the inner heat-dissipating board 3, between the inner heat-dissipating board 3 and the outer heat-dissipating board 4, and at the backside of the outer heat-dissipating board 4.

A body flow path 21 (a portion shown with thick lines in FIG. 1) that circulates cooling liquid such as water, is formed near the heat-receiving board 12. Heat generated in the MPU element 11 is transmitted to the cooling liquid in the body flow path 21 via the heat-receiving board 12. The body flow path 21 in the first housing 1 communicates with an inner flow path 23 and an outer flow path 24 (portions shown with broken lines in FIG. 1) formed in the inner heat-dissipating board 3 and the outer heat-dissipating board 4, respectively. These inner flow path 23 and the outer flow path 24 are formed in a meandering shape so as to increase heat dissipation efficiency. A pump 14 is provided in the middle of the body flow path 21 in the first housing 1, and the pump 14 drives the cooling liquid to circulate through the inside of the body flow path 21, the inner flow path 23, and the outer flow path 24.

An LCD panel 15 being used for a display is provided on the surface of the second housing 2 (first housing 1 side). A plurality of pivots 32 are provided at the backside of the second housing 2, a beam 16 is arranged between the pivot 32 and a pivot 33 provided in the inner heat-dissipating board 3, and the beam 16 is arranged between the pivot 33 of the inner heat-dissipating board 3 and a pivot 34 provided in the outer heat-dissipating board 4. According to such a configuration, the inner heat-dissipating board 3 and the outer heat-dissipating board 4 are movable to the second housing 2.

FIGS. 2A and 2B are views showing movements of the inner heat-dissipating board 3 and the outer heat-dissipating board 4. FIG. 2A shows a state where the inner heat-dissipating board 3 and the outer heat-dissipating board 4 are closed, that is to say, a state where distances between the second housing 2 and the inner heat-dissipating board 3 and between the inner heat-dissipating board 3 and the outer heat-dissipating board 4 are reduced. FIG. 2B shows a state where the inner heat-dissipating board 3 and the outer heat-dissipating board 4 are opened, that is to say, a state where the distance between the second housing 2 and the inner heat-dissipating board 3 and the distance between the inner heat-dissipating board 3 and the outer heat-dissipating board 4 are increased.

Figure 3:
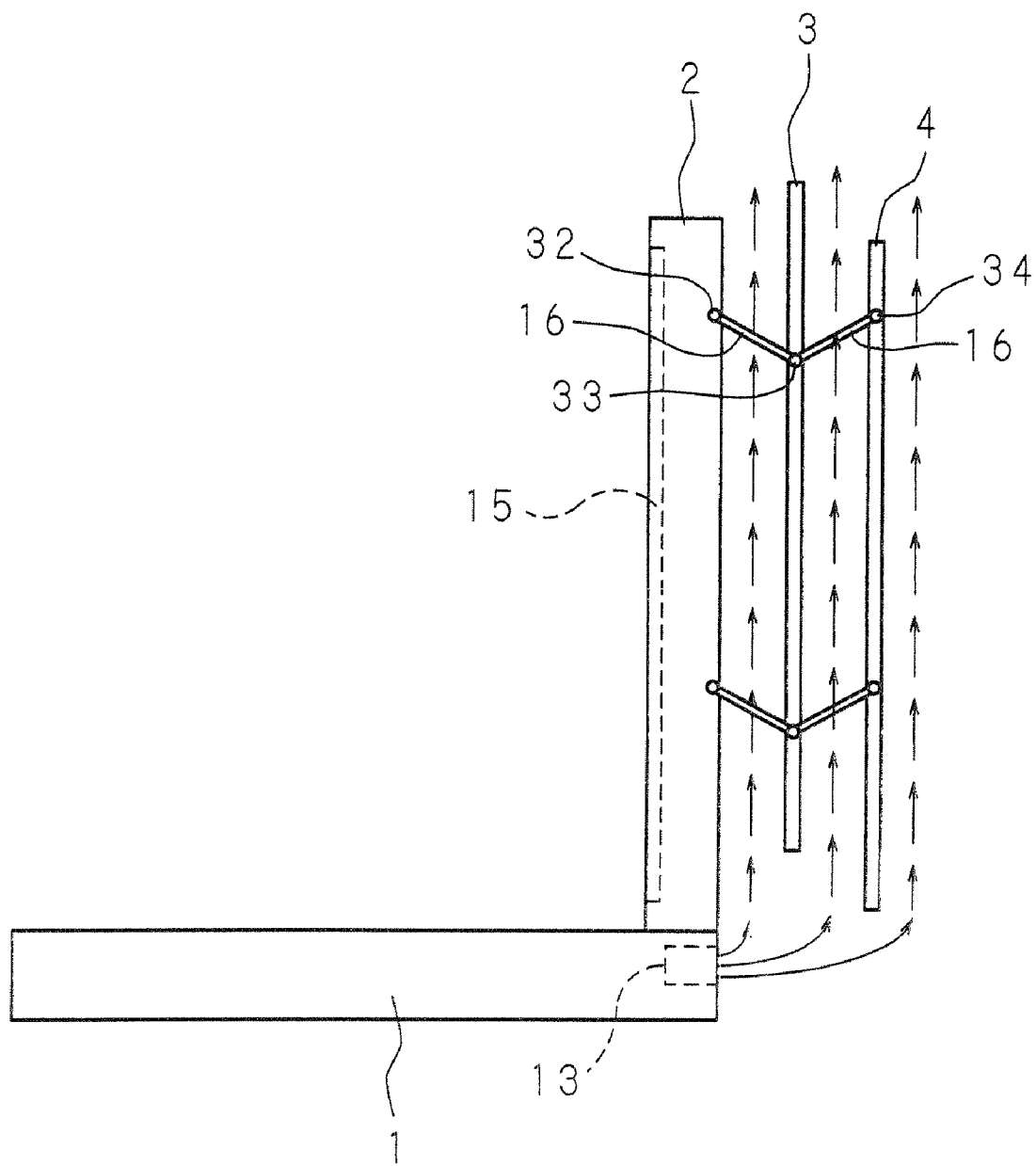
FIG. 3 is a view showing a cooling airflow in the electronic apparatus according to the present invention.

Then, heat dissipation treatment will be explained. During the heat dissipation treatment, a state where the inner heat-dissipating board 3 and the outer heat-dissipating board 4 are opened (refer to FIG. 2B) is kept. The heat generated in the MPU element 11 is transmitted to the cooling liquid in the body flow path 21 via the heat-receiving board 12, the cooling liquid flows through the inner flow path 23 in the inner heat-dissipating board 3 and the outer flow path 24 in the outer heat-dissipating board 4, and the heat is dissipated to the outside from the inner heat-dissipating board 3 and the outer heat-dissipating board 4. In this case, as shown in FIG. 3, air for cooling is sent out between the second housing 2 and the inner heat-dissipating board 3, between the inner heat-dissipating board 3 and the outer heat-dissipating board 4, and at the backside of the outer heat-dissipating board 4 from the fan 13 so that a larger heat dissipation effect can be obtained.

According to the present invention, since two heat-dissipating boards (inner heat-dissipating board 3 and outer heat-dissipating board 4) are provided, a heat dissipation area is increased as compared to providing only one heat-dissipating board, thereby making it possible to improve a heat dissipation characteristic. In addition, since these two heat-dissipating boards are configured to be movable, an excellent heat dissipation characteristic can be exhibited during the heat dissipation treatment, whereas during not performing the heat dissipation treatment, they can compactly be housed, so that large room is not required.

Hereafter, examples of such electronic apparatus according to the present invention will be explained in a first embodiment through a third embodiment.

First Embodiment

Figure 4:
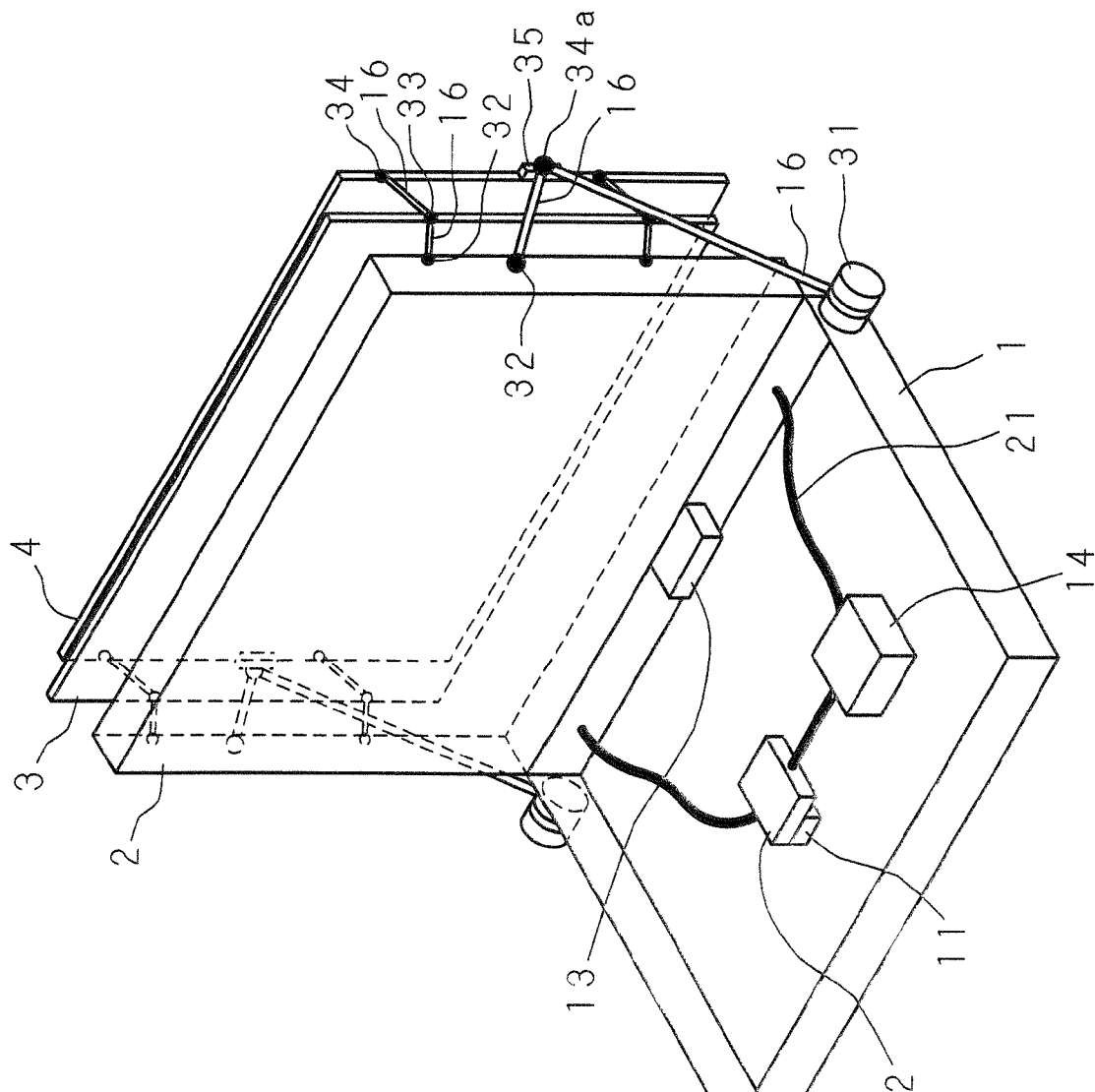
FIG. 4 is a perspective view showing a configuration of an electronic apparatus according to a first embodiment.

FIG. 4 is a perspective view showing a configuration of an electronic apparatus according to a first embodiment; FIGS. 5A through 5D are side views showing an open/close operation of two heat-dissipating boards, and FIG. 6 is a side view of the electronic apparatus including a structure of an expanded outer heat-dissipating board. In FIGS. 4 through 6, the same number is given to a portion the same as or similar to that of FIGS. 1 through 3. Incidentally, in FIG. 4, illustration of the flow path of the cooling liquid formed in the inner heat-dissipating board 3 and the outer heat-dissipating board 4 is omitted.

According to the first embodiment, the beam 16 is arranged between a pole brace 31 provided at the side of the first housing 1 and a pivot 34a in the center of the outer heat-dissipating board 4. The pivot 34a of outer heat-dissipating board 4 is provided on a slider 35 that slides on the side of the outer heat-dissipating board 4 (refer to FIG. 6), a position of the pivot 34a is not fixed, and the pivot 34a moves on the side of the outer heat-dissipating board 4.

Figure 5A:
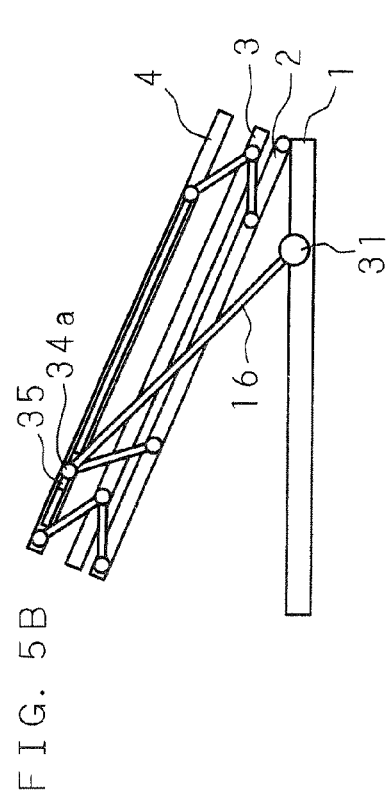
FIGS. 5A through 5D are side views showing an open/close operation of a heat-dissipating board in the electronic apparatus according to the first embodiment.
Figure 6:
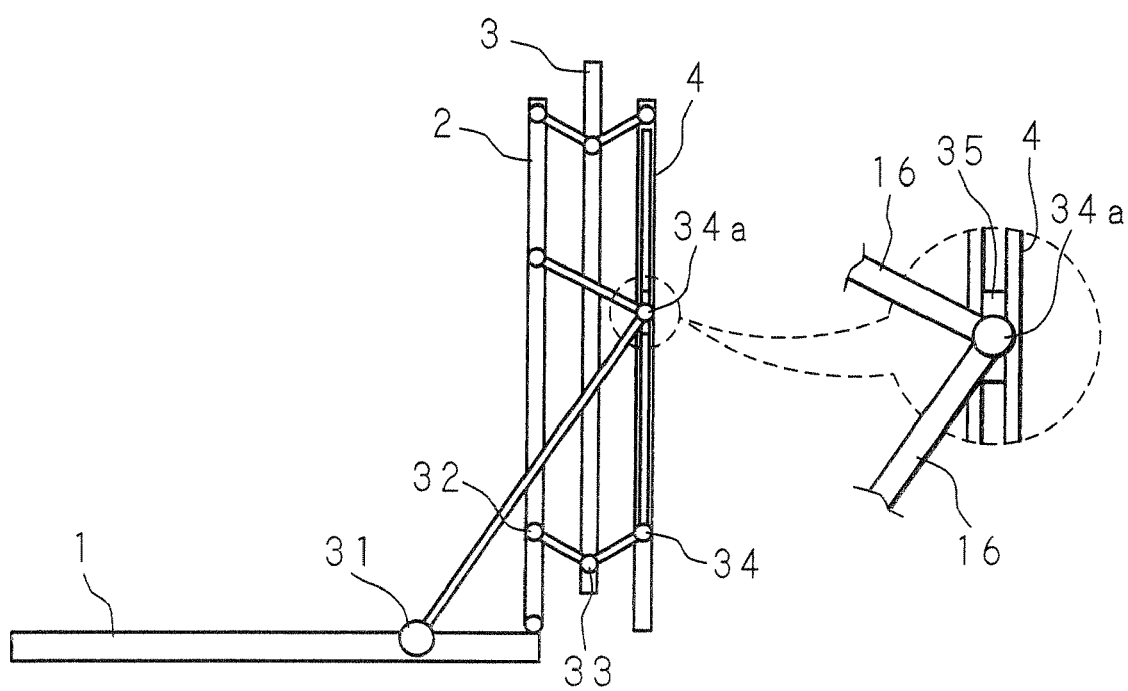
FIG. 6 is a side view of the electronic apparatus of the first embodiment including a structure of an expanded outer heat-dissipating board.

In a state where the electronic apparatus is not used, namely in a state where a cover is closed and the second housing 2 (cover body portion) covers the first housing 1 (main body portion), the inner heat-dissipating board 3 and the outer heat-dissipating board 4 are folded to cover the second housing 2 (FIG. 5A). At this time, two heat-dissipating boards (inner heat-dissipating board 3 and outer heat-dissipating board 4) are housed compactly.

Figure 5B:
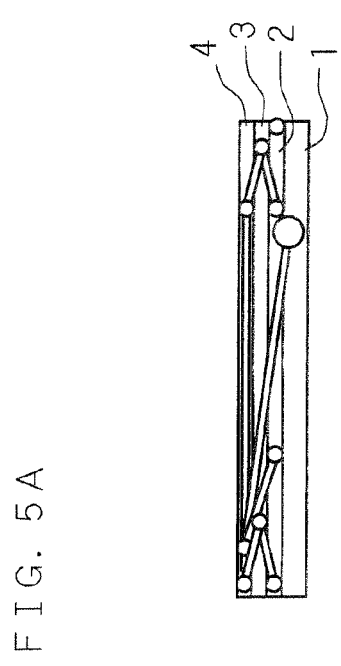
Figure 5C:
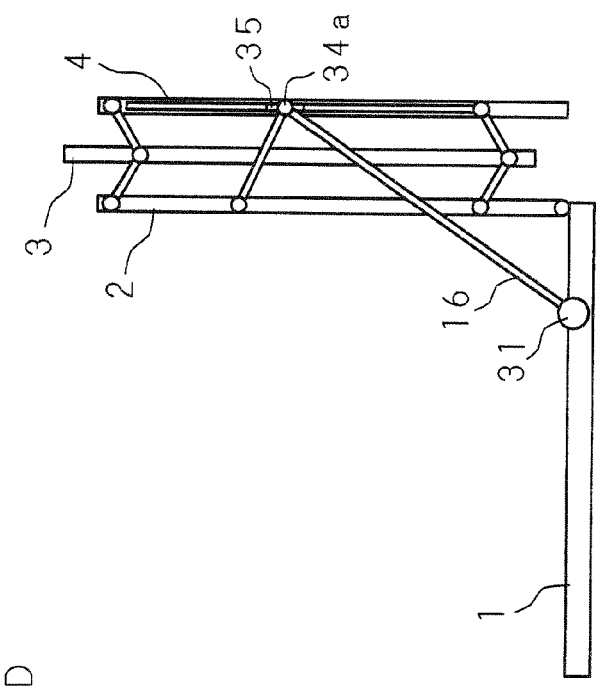
Figure 5D:
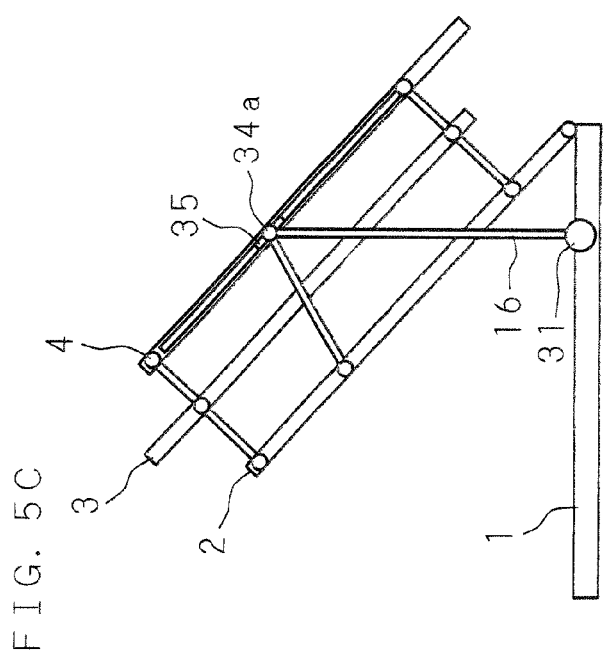

When a user then begins to open the cover for using the electronic apparatus, the inner heat-dissipating board 3 and the outer heat-dissipating board 4 also move with the movement of the second housing 2 (FIGS. 5B and 5C). In a state where the cover is completely opened and the second housing 2 stands straight, the second housing 2, the inner heat-dissipating board 3, and the outer heat-dissipating board 4 are positioned in a mode in which predetermined room is formed between the second housing 2 and the inner heat-dissipating board 3, and between the inner heat-dissipating board 3 and the outer heat-dissipating board 4 (FIG. 5D).

When a user opens the cover for the purpose of using the electronic apparatus like this, the electronic apparatus enters a state of performing the heat dissipation treatment, and power will be turned on after that and the electronic apparatus will be then used, so that user's operability is excellent. Meanwhile, when a user completes using the electronic apparatus and closes the cover thereof, according to a reverse process to opening the cover, the inner heat-dissipating board 3 and the outer heat-dissipating board 4 sequentially move from FIGS. 5D to 5A through 5C and 5B with the movement of the second housing 2 to be housed compactly.

Second Embodiment

Figure 7:
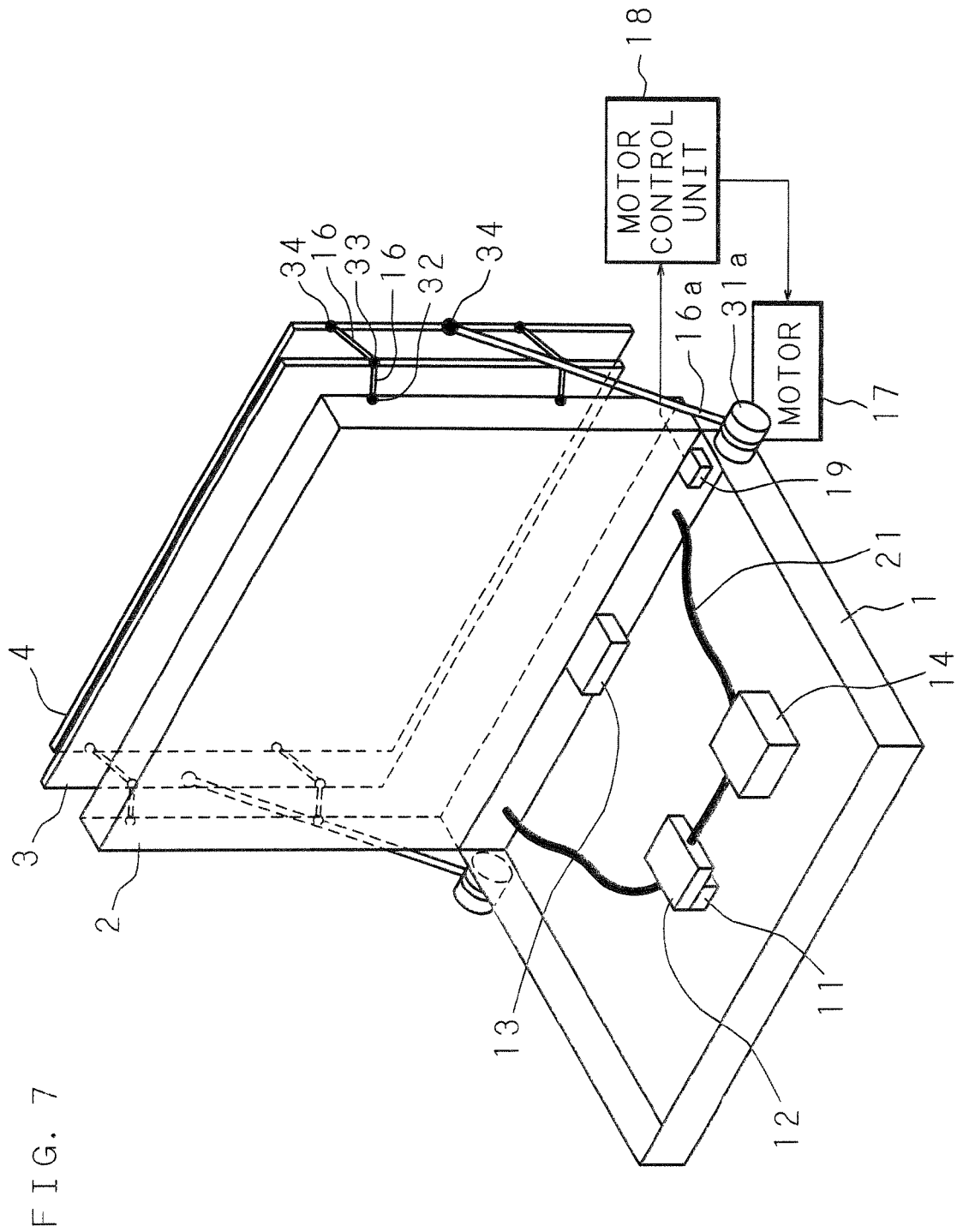
FIG. 7 is a perspective view showing a configuration of an electronic apparatus according to a second embodiment.
Figure 8:
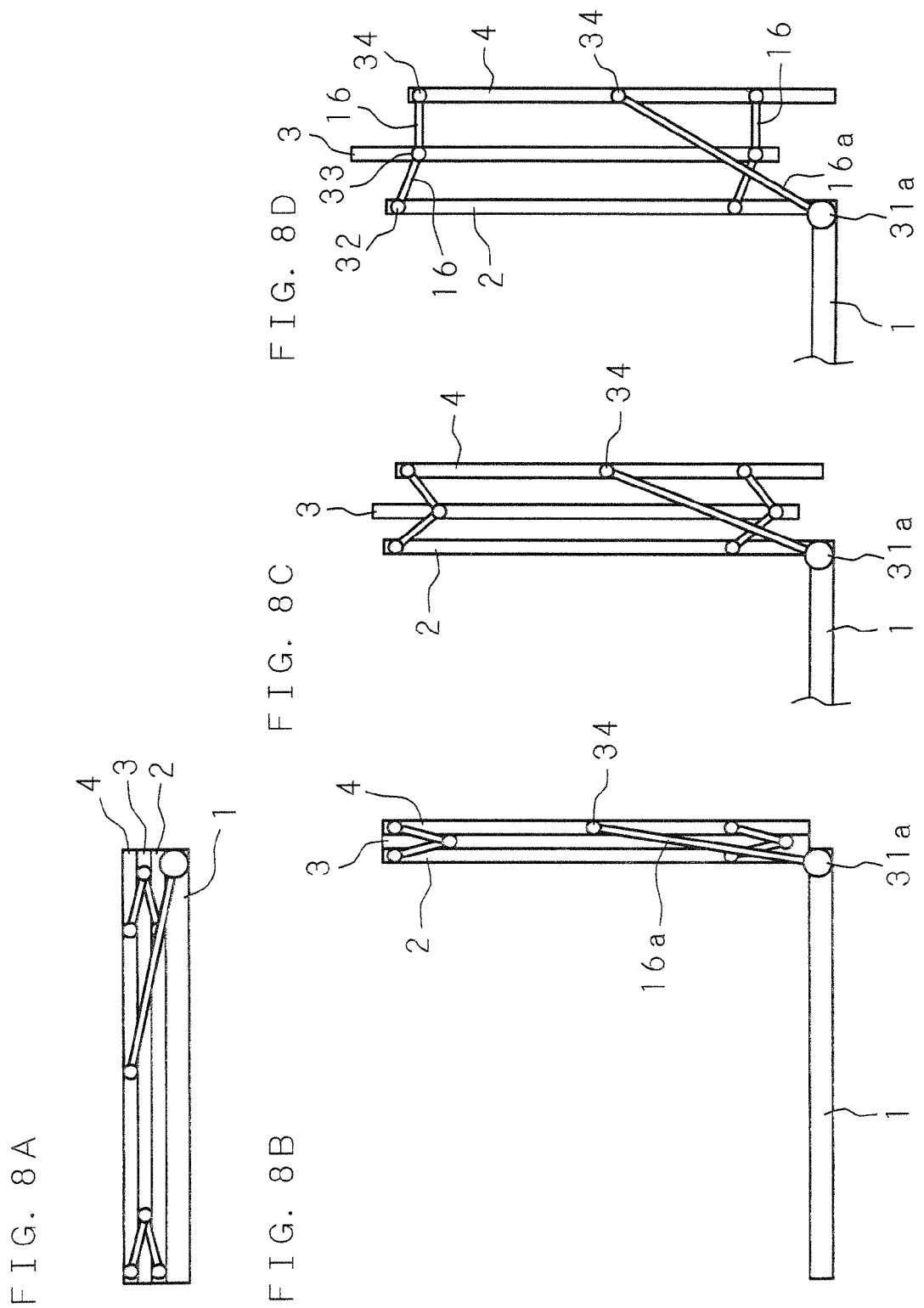
FIGS. 8A through 8D are side views showing an open/close operation of a heat-dissipating board in the electronic apparatus according to the second embodiment.

FIG. 7 is a perspective view showing a configuration of an electronic apparatus according to a second embodiment, and FIGS. 8A through 8D are side views showing an open/close operation of two heat-dissipating boards. In FIGS. 7 and 8, the same number is given to a portion the same as or similar to that of FIGS. 1 through 6. Incidentally, in FIG. 7, illustration of the flow path of the cooling liquid formed in the inner heat-dissipating board 3 and the outer heat-dissipating board 4 is omitted.

According to the second embodiment, a beam 16a is arranged between a pole brace 31a provided on the side of the first housing 1 and the pivot 34 in the center of the outer heat-dissipating board 4. A motor 17 is coupled to the pole brace 31a, the pole brace 31a is driven by the motor 17 which is driven and controlled by a motor control unit 18, and an angle of gradient of the beam 16a can be arbitrarily adjusted.

Moreover, an angle sensor 19 that detects an opening/closing angle of the second housing 2 is provided in the first housing 1, and the angle sensor 19 outputs a detected result to the motor control unit 18. When detecting that the cover of the electronic apparatus is opened (that the second housing 2 stands straight) based on the detected result of the angle sensor 19, the motor control unit 18 drives the motor 17 to an on-state.

In a state where the electronic apparatus is not used, to be more specific, in a state where the cover is closed and the second housing 2 (cover body portion) covers the first housing 1 (main body portion), the inner heat-dissipating board 3 and the outer heat-dissipating board 4 are folded to cover the second housing 2 (FIG. 8A). At this time, two heat-dissipating boards (inner heat-dissipating board 3 and outer heat-dissipating board 4) are housed compactly.

A user then opens the second housing 2 (cover body portion) for using the electronic apparatus. The motor control unit 18 determines that the second housing 2 is opened based on the detected result of the angle sensor 19, and at this time, the motor 17 turns on (FIG. 8B). An slope of the beam 16a becomes gentle gradually by the drive of the motor 17, and in a mode in which room with predetermined distance is formed between the second housing 2 and the inner heat-dissipating board 3 and between the inner heat-dissipating board 3 and the outer heat-dissipating board 4, the inner heat-dissipating board 3 and the outer heat-dissipating board 4 are positioned (FIGS. 8C and 8D).

When a user opens the cover for using the electronic apparatus like this, the electronic apparatus detects the opening operation and then enters in a state of automatically performing the heat dissipation treatment, and power will be turned on after that and the electronic apparatus will be used, so that user's operability is excellent. When a user completes using the electronic apparatus and closes the cover thereof, according to a reverse process to opening the cover, the inner heat-dissipating board 3 and the outer heat-dissipating board 4 are housed compactly. Meanwhile, there is also possible that the motor control unit 18 determines based on the detected result of the angle sensor 19 that the second housing 2 is closed to turn off the motor 17 automatically.

Third Embodiment

Figure 9:
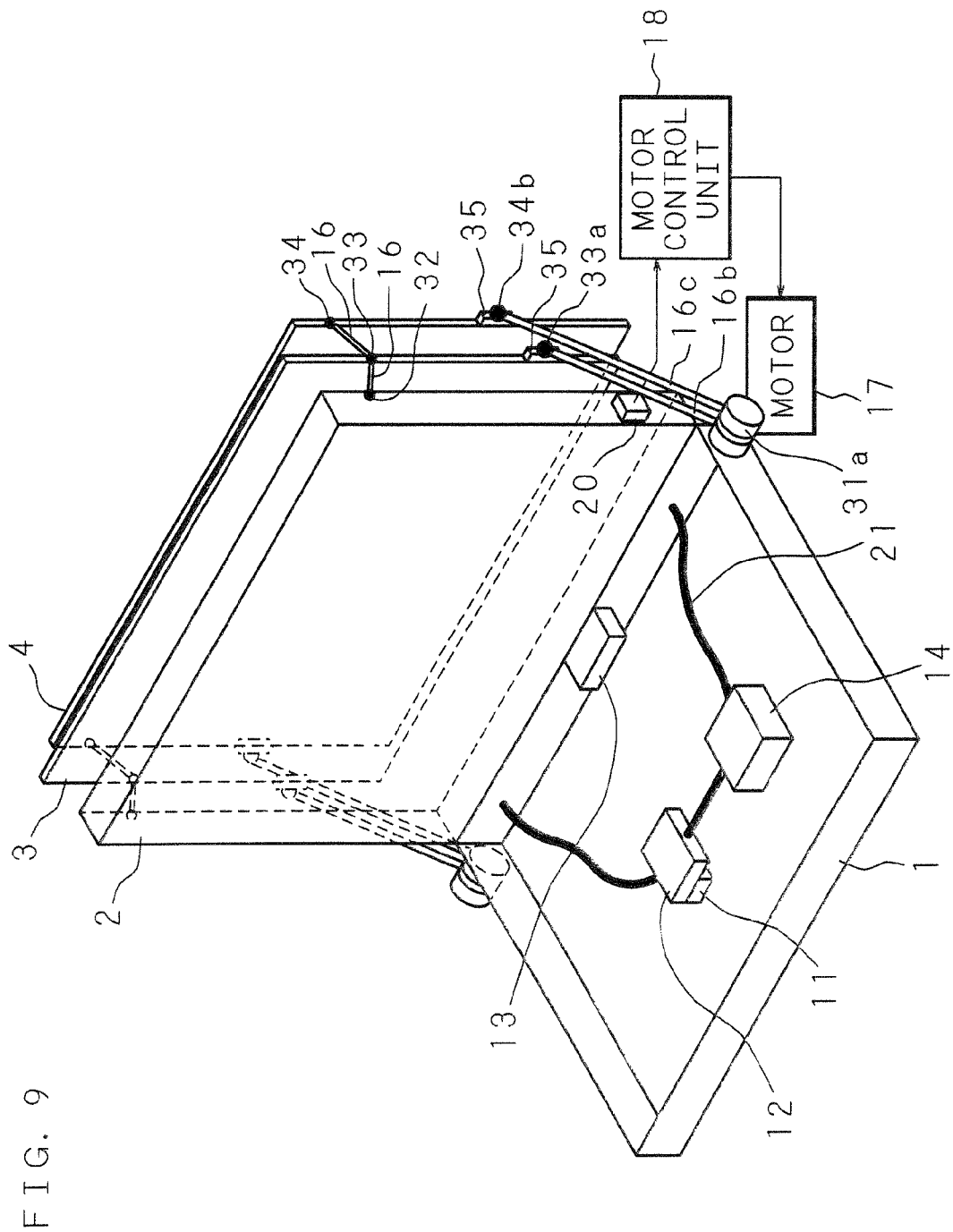
FIG. 9 is a perspective view showing a configuration of an electronic apparatus according to a third embodiment.
Figure 10A:
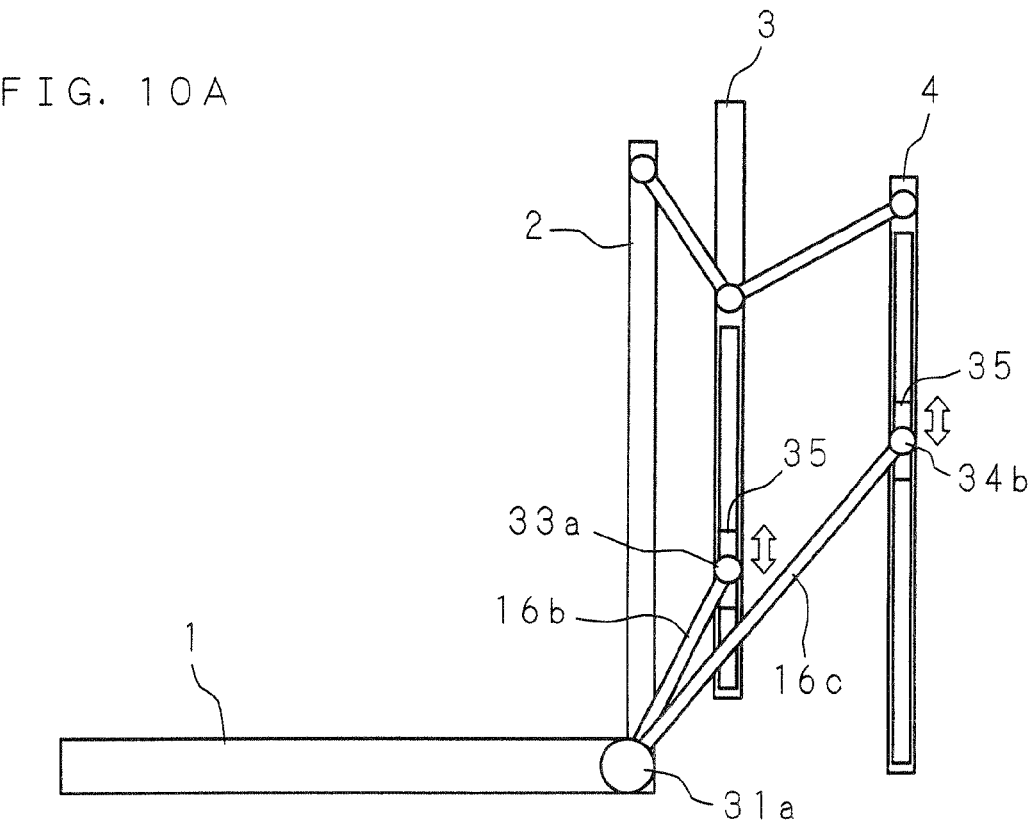
FIGS. 10A and 10B are side views showing an open/close operation of a heat-dissipating board in the electronic apparatus according to the third embodiment.
Figure 10B:
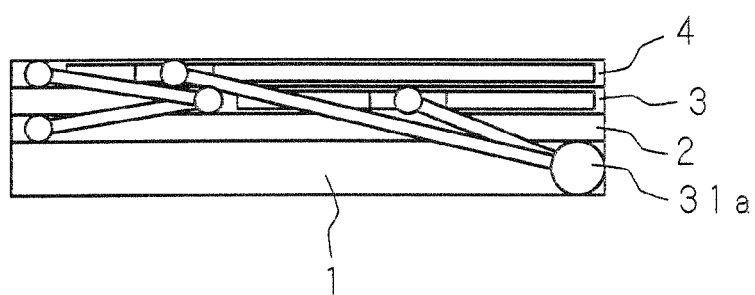

FIG. 9 is a perspective view showing a configuration of an electronic apparatus according to a third embodiment, and FIGS. 10A and 10B are side views showing an open/close operation (FIG. 10A shows an open state, and FIG. 10B shows a close state) of two heat-dissipating boards. In FIGS. 9 and 10, the same number is given to a portion the same as or similar to that of FIGS. 1 through 8. Incidentally, in FIG. 9, illustration of the flow path of the cooling liquid formed in the inner heat-dissipating board 3 and the outer heat-dissipating board 4 is omitted.

According to the third embodiment, a beam 16b and a beam 16c are arranged between the pole brace 31a provided on the side of the first housing 1 and a lower pivot 33a of the inner heat-dissipating board 3, and a lower pivot 34b of the outer heat-dissipating board 4, respectively. The pivot 33a is provided on the slider 35 that slides on the side of the inner heat-dissipating board 3, and the pivot 33a moves on the side of the inner heat-dissipating board 3. Moreover, the pivot 34b is provided on the slider 35 that slides on the side of the outer heat-dissipating board 4, and the pivot 34b moves on the side of the outer heat-dissipating board 4. The beam 16b is a beam to determine a position of the inner heat-dissipating board 3, in other words, a distance between the second housing 2 and the inner heat-dissipating board 3, and the beam 16c is a beam to determine a position of the outer heat-dissipating board 4, in other words, a distance between the inner heat-dissipating board 3 and the outer heat-dissipating board 4.

A motor 17 is connected to the pole brace 31a, the pole brace 31a is driven by the motor 17 which is driven and controlled by a motor control unit 18, and respective angles of gradient of the beam 16b and the beam 16c can be arbitrarily adjusted.

Moreover, a temperature sensor 20 that measures a temperature of the second housing 2 is provided thereon, and the temperature sensor 20 outputs a measurement result of the temperature to the motor control unit 18. The motor control unit 18 adjusts angles of gradient of the beam 16b and the beam 16c based on the temperature measurement result by the temperature sensor 20.

When the cover is opened and the electronic apparatus is in a state to be used, a temperature at the side of the second housing 2 is measured by the temperature sensor 20, and the temperature measurement result is then outputted to the motor control unit 18. According to this temperature measurement result, the angles of gradient of the beam 16b and the beam 16c are automatically adjusted, so that a distance between the second housing 2 and the inner heat-dissipating board 3 and a distance between the inner heat-dissipating board 3 and the outer heat-dissipating board 4 are automatically controlled (FIG. 10A). Concretely, when the temperature of the measurement result is high, the pivot 33a and the pivot 34b are shifted to lower positions to make the slopes of the beam 16b and the beam 16c gentle, so that the distance between the second housing 2 and the inner heat-dissipating board 3, and the distance between the inner heat-dissipating board 3 and the outer heat-dissipating board 4 are extended, thereby making it possible to obtain a higher heat dissipation characteristic. When a user completes using the electronic apparatus and closes the cover thereof, the inner heat-dissipating board 3 and the outer heat-dissipating board 4 are folded on the second housing 2 to thereby housed compactly (FIG. 10B).

Since the heat dissipation characteristic is automatically adjusted at a high or low level based on the temperature at the side of the second housing 2 like this, a suitable heat dissipation characteristic can be exhibited according to a fluctuation of a temperature state, so that the electronic apparatus is prevented from entering a high temperature state in advance, thereby making it possible to improve user's operability.

Incidentally, in the third embodiment, the temperature at the side of the second housing 2 is measured and the heat dissipation characteristic is adjusted, but it is a matter of course that the same effect can be obtained even when a temperature at the backside of the second housing 2, a temperature of the inner heat-dissipating board 3 or the outer heat-dissipating board 4, or a temperature near the MPU element 11 is measured, and the heat dissipation characteristic is adjusted based on the temperature measurement result.

Moreover, it cannot be overemphasized that the control of the motor 17 described in the second embodiment and the control of the motor 17 described in the third embodiment may be performed simultaneously.

Moreover, in the first through the third embodiments mentioned above, two heat-dissipating boards are provided, but the present invention is similarly applicable even when three or more heat-dissipating boards are provided. Moreover, installation of the pole brace, the pivot, and the beam provided in the first housing 1, the second housing 2, the inner heat-dissipating board 3, and the outer heat-dissipating board 4 is shown only for an example, but it is a matter of course that as far as it is configured so that a plurality of heat-dissipating boards may be movable, the installation thereof may be arbitrary.

Next, other embodiments of the present invention in which a plurality of heat-dissipating boards having the flow paths for the cooling liquid are provided, and a flow rate of the cooling liquid flowing through the flow paths in those heat-dissipating boards is controlled will be explained.

Fourth Embodiment

Figure 11:
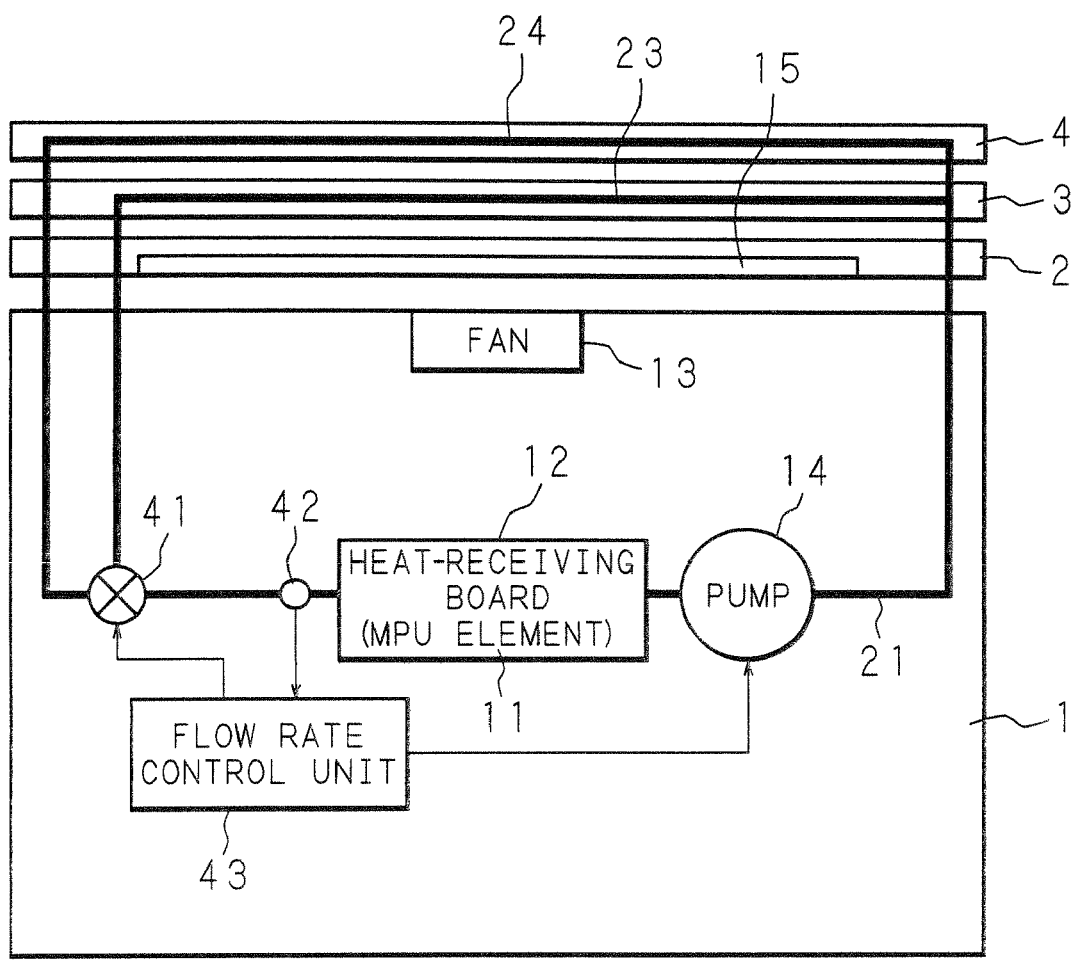
FIG. 11 is a schematic diagram showing a configuration of an electronic apparatus according to a fourth embodiment.

FIG. 11 is a schematic diagram showing a configuration of an electronic apparatus (notebook type computer) of a fourth embodiment. Incidentally, the whole configuration of this electronic apparatus is similar to that shown in FIG. 1. This electronic apparatus includes the first housing 1 at the side of the main body portion, the second housing 2 at the side of the cover body portion, and the inner heat-dissipating board 3 and the outer heat-dissipating board 4 provided at the backside of the second housing 2 as a plurality of heat dissipation portions. Moreover, there is provided in the first housing 1 the fan 13 that sends out air for cooling between the second housing 2 and the inner heat-dissipating board 3, between the inner heat-dissipating board 3 and the outer heat-dissipating board 4, and at the backside of the outer heat-dissipating board 4. The LCD panel 15 being used for the display is provided on the surface of the second housing 2 (first housing 1 side).

The heat-receiving board 12 is provided in the first housing 1 corresponding particularly to the MPU element 11 as a heat-radiating component with a large heating value. The body flow path 21 (portions shown with thick lines in FIG. 11) for circulating the cooling liquid such as water, is formed near the heat-receiving board 12, and the heat generated in the MPU element 11 is transmitted to the cooling liquid in the body flow path 21 via the heat-receiving board 12.

The body flow path 21 in the first housing 1 communicates with the inner flow path 23 and the outer flow path 24 (portions shown with thick lines in FIG. 11) formed in the inner heat-dissipating board 3 and the outer heat-dissipating board 4, respectively. In a manner similar to the embodiments described above, these inner flow path 23 and the outer flow path 24 are formed in a meandering shape (refer to FIG. 1) in parallel to each other. The pump 14 is provided in the middle of the body flow path 21, and the pump 14 drives the cooling liquid to pass through the body flow path 21 and to circulate in the inner flow path 23 and the outer flow path 24 in parallel.

A valve 41 whose opening is controllable is provided at a branch portion between the inner flow path 23 and the outer flow path 24. This valve 41 is always full opening to the outer flow path 24, and the opening is adjusted to the inner flow path 23. Moreover, a temperature sensor 42 is provided near the heat-receiving board 12, and the temperature sensor 42 outputs a measurement result of a temperature to a flow rate control unit 43. The flow rate control unit 43 controls an output of the pump 14 and the opening of the valve 41 based on the temperature measurement result by the temperature sensor 42.

Then, operation thereof will be explained. When the electronic apparatus is used by a user, heat will be generated from the MPU element 11, and the temperature measured by the temperature sensor 42 will rise. The output of the pump 14 and the opening of valve 41 are then adjusted based on the temperature measurement result by the temperature sensor 42, so that a flow rate of the cooling liquid flowing in the inner flow path 23 and the outer flow path 24 is controlled. In this example since the valve 41 is always full opening to the outer flow path 24, a flow rate of the cooling liquid flowing in the outer flow path 24 is controlled according to the output control of the pump 14. Meanwhile, since the opening of the valve 41 is adjusted to the inner flow path 23, a flow rate of the cooling liquid flowing in the inner flow path 23 is controlled according to an opening control of the valve 41 and the output control of the pump 14.

Figure 12:
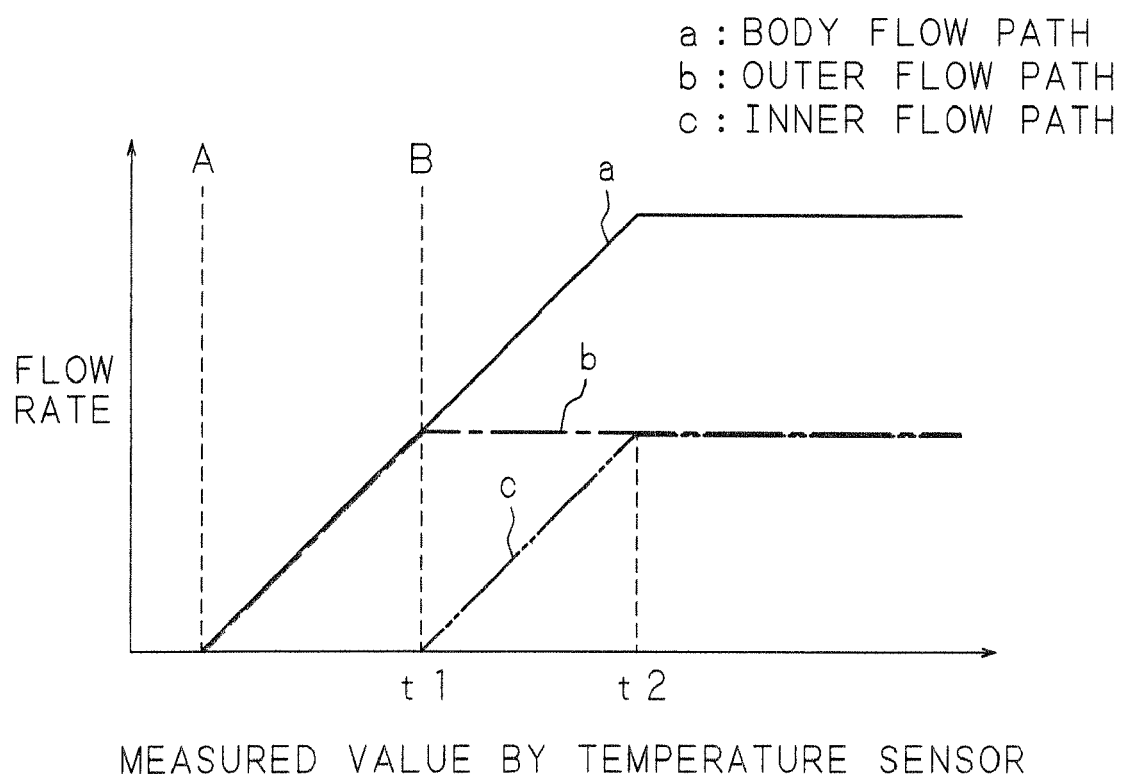
FIG. 12 is a graphic chart showing an example of a flow rate control of a cooling liquid in the electronic apparatus according to the fourth embodiment.

FIG. 12 is a graphic chart showing an example of a relationship between the measured value by the temperature sensor 42 and the flow rate control of the cooling liquid in the body flow path 21, the inner flow path 23, and the outer flow path 24. In FIG. 12, a solid line a, an alternate long and short dash line b, and an alternate long and two short dashes line c represent a total flow rate of the cooling liquid flowing in the body flow path 21, a flow rate of the cooling liquid flowing in the outer flow path 24, and a flow rate of the cooling liquid flowing in the inner flow path 23, respectively.

At room-temperature where the electronic apparatus is not used (A in FIG. 12), the cooling liquid is made to flow through neither the inner flow path 23 nor the outer flow path 24. After the electronic apparatus begins to be used and until the measured value in the temperature sensor 42 reaches t1 (for example, 55 degrees centigrade) (B in FIG. 12), the opening of the valve 41 is adjusted so as for the cooling liquid to be made not to flow in the inner flow path 23, and the output of the pump 14 is increased according to a temperature rise, so that the flow rate of the cooling liquid flowing in the outer flow path 24 is increased linearly. This is because when the temperature is low, sufficient heat dissipation result can be obtained only by the heat dissipation treatment from the outer heat-dissipating board 4. In addition, the reason that the cooling liquid is made to selectively flow to the outer flow path 24 is to actively reduce the temperature of the outer heat-dissipating board 4 to which a user will possibly contact.

When the measured value by the temperature sensor 42 reaches t1, the flow rate of the cooling liquid flowing in the outer flow path 24 will be in a saturation state. When the measured value exceeds t1, according to the temperature rise, the opening of the valve 41 is then opened and the output of the pump 14 is also increased, so that the flow rate of the cooling liquid flowing in the inner flow path 23 is increased linearly. When the measured value by the temperature sensor 42 then reaches t2 (for example, 70 degrees centigrade), the flow rate of the cooling liquid in the inner flow path 23 will also be saturated.

Preferably, during such heat dissipation treatment, air for cooling is sent out between the second housing 2 and the inner heat-dissipating board 3, between the inner heat-dissipating board 3 and the outer heat-dissipating board 4, and at the backside of the outer heat-dissipating board 4 from the fan 13 (refer to FIG. 3), so that the larger heat dissipation effect is obtained.

Thus, according to the fourth embodiment, since the heat dissipation treatment is performed using two heat-dissipating boards (inner heat-dissipating board 3 and outer heat-dissipating board 4), a more excellent heat dissipation effect can be obtained compared with the case of using one heat-dissipating board. Moreover, since the respective flow rates of the cooling liquid flowing in the inner flow path 23 and the outer flow path 24 are controlled based on the temperature of the electronic apparatus, efficient heat dissipation treatment according to the temperature situation may be performed.

By the way, according to the example mentioned above, a case of using both of the linear control of the output of the pump 14 and the linear control of the opening of the valve 41 together has been explained, but it is also possible to control the flow rate of the cooling liquid by the linear control of either the pump output or the valve opening.

What is necessary is just to perform it as follows only in using the linear control of the valve opening. That is, it is configured so that the opening control of the valve 41 can be performed also to the outer flow path 24, and then the opening of the valve 41 may be linearly opened respectively to the inner flow path 23 and the outer flow path 24 according to the temperature rise, so that the flow rate control as shown in FIG. 12 can be achieved even when the output of the pump 14 is set constant.

In addition, what is necessary is just to perform it as follows only in the linear control of the pump output. That is, when the measured value by the temperature sensor 42 reaches t1, the valve 41 is completely opened also to the inner flow path 23. The output of the pump 14 is linearly controlled after that according to the temperature rise, so that the flow rate control as shown in FIG. 12 may be achieved.

Fifth Embodiment

Figure 13:
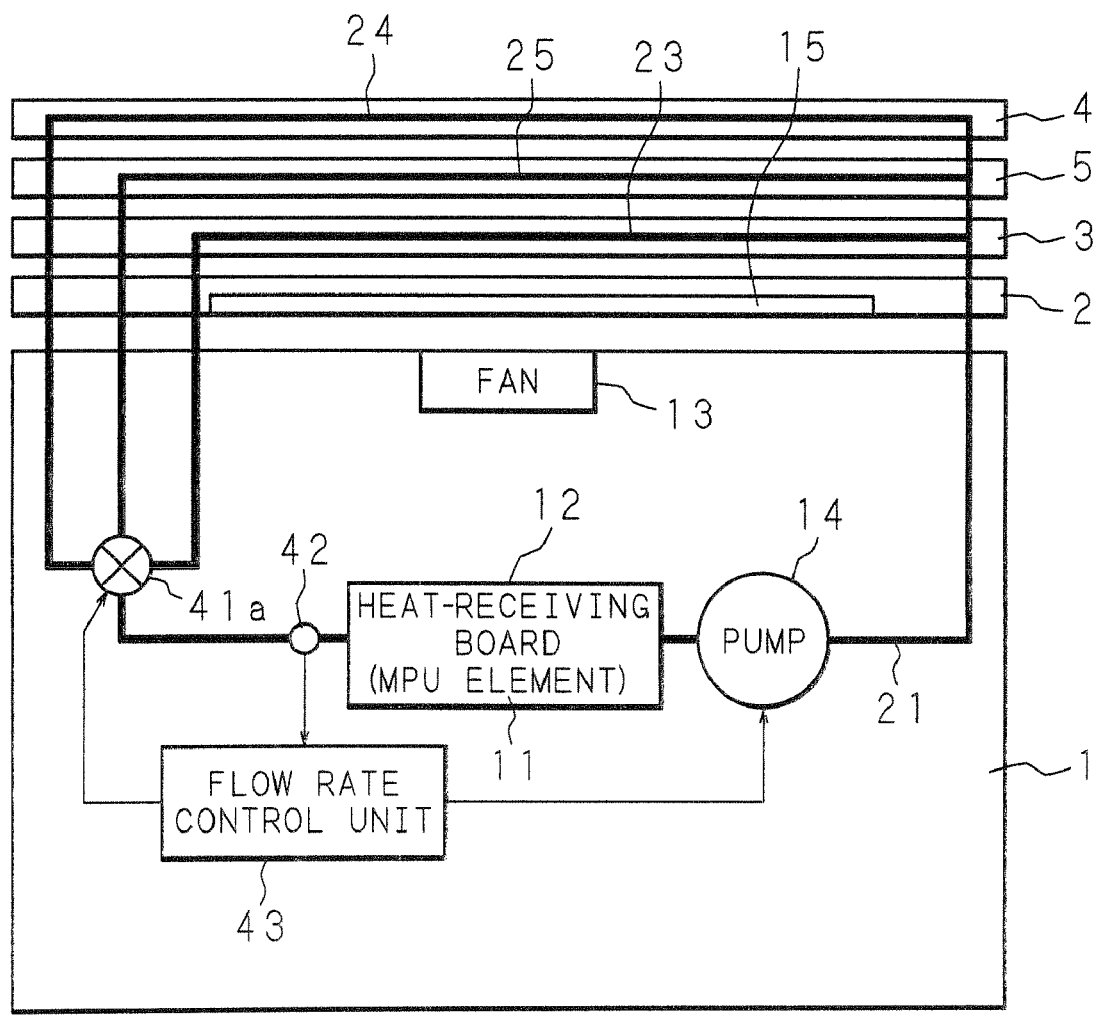
FIG. 13 is a schematic diagram showing a configuration of an electronic apparatus according to a fifth embodiment.

FIG. 13 is a schematic diagram showing a configuration of an electronic apparatus (notebook type computer) of a fifth embodiment. In FIG. 13, the same number is given to a portion the same as or similar to that of FIG. 11. According to the fifth embodiment, three heat-dissipating boards are provided at the back side of the second housing 2. In addition to the inner heat-dissipating board 3 having the inner flow path 23, and the outer heat-dissipating board 4 having the outer flow path 24, a central heat-dissipating board 5 having a central flow path 25 is provided between them.

The body flow path 21 in the first housing 1 communicates with the inner flow path 23, the central flow path 25, and the outer flow path 24 formed in the inner heat-dissipating board 3, the central heat-dissipating board 5, and the outer heat-dissipating board 4, respectively, in parallel to each other. The pump 14 is provided in the middle of the body flow path 21, and the pump 14 drives the cooling liquid to pass through the body flow path 21 and to circulate in the inner flow path 23, the central flow path 25, and the outer flow path 24 in parallel.

A valve 41a whose opening is controllable to the inner flow path 23 and the central flow path 25, respectively, is provided at a branch portion among the inner flow path 23, the central flow path 25, and the outer flow path 24. Moreover, the temperature sensor 42 is provided near the heat-receiving board 12, and the temperature sensor 42 outputs the measurement result of the temperature to the flow rate control unit 43. The flow rate control unit 43 controls the output of the pump 14 and the opening of the valve 41a based on the temperature measurement result by the temperature sensor 42.

Then, operation thereof will be explained. In a manner similar to that of the fourth embodiment, the output of the pump 14 and the opening of the valve 41a are adjusted based on the temperature measurement result by the temperature sensor 42, so that the flow rate of the cooling liquid flowing in the inner flow path 23, the central flow path 25, and the outer flow path 24 is controlled.

Figure 14:
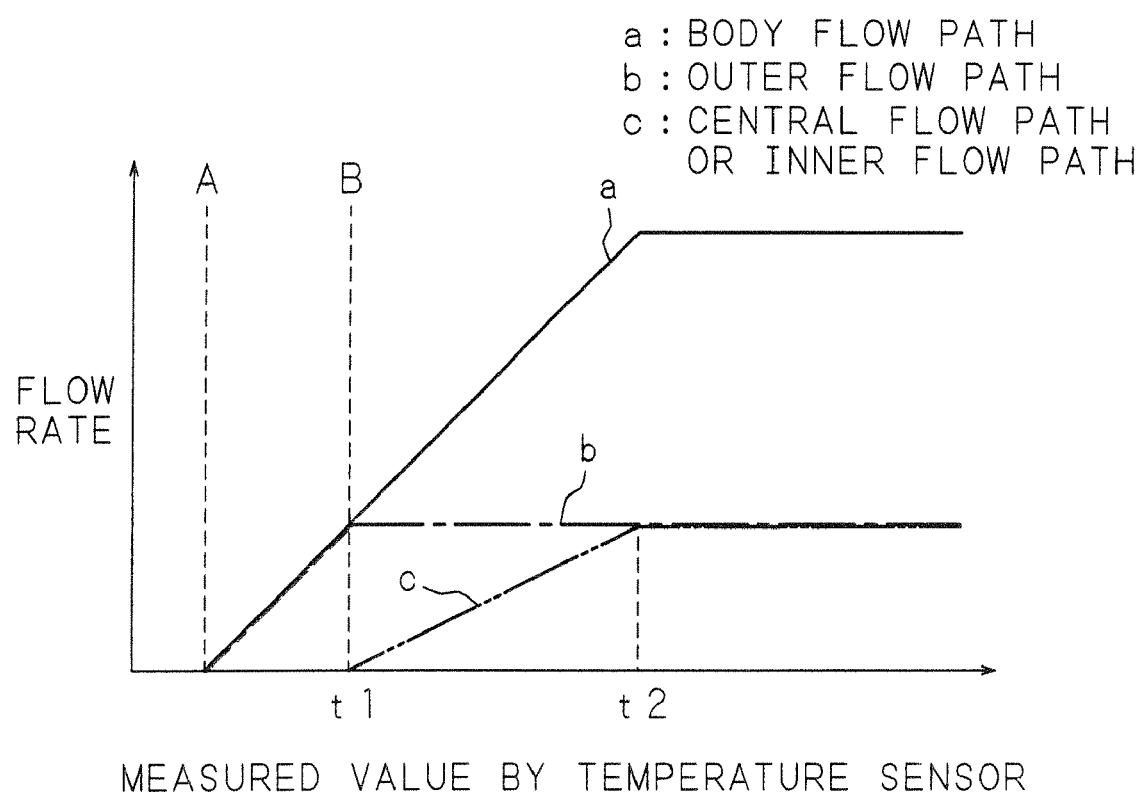
FIG. 14 is a graphic chart showing an example of a flow rate control of a cooling liquid in the electronic apparatus according to the fifth embodiment.

FIG. 14 is a graphic chart showing an example of a relationship between the measured value by the temperature sensor 42, and the flow rate control of the cooling liquid in the body flow path 21, the inner flow path 23, the central flow path 25, and the outer flow path 24. In FIG. 14, a solid line a, an alternate long and short dash line b, and an alternate long and two short dashes line c represent the total flow rate of the cooling liquid flowing in the body flow path 21, the flow rate of the cooling liquid flowing in the outer flow path 24, and a flow rate of the cooling liquid flowing in the central flow path 25 or the inner flow path 23, respectively. In this example, since the flow rates of the cooling liquid in the central flow path 25 and the inner flow path 23 are controlled by the valve 41a in common, the flow rate in the inner flow path 23 is the same as that in the central flow path 25.

At room-temperature (A in FIG. 14), the cooling liquid is made to flow into no flow paths. Until the measured value by the temperature sensor 42 reaches t1 (for example, 55 degrees centigrade) (B in FIG. 14) the opening of the valve 41a is adjusted and the cooling liquid is made to flow into neither the central flow path 25 nor the inner flow path 23, and the output of the pump 14 is increased according to the temperature rise, so that the flow rate of the cooling liquid flowing in the outer flow path 24 is increased linearly. When the measured value exceeds t1, according to the temperature rise, the opening of the valve 41a is opened and the output of the pump 14 is also increased, so that the flow rates of the cooling liquid flowing in the central flow path 25 and the inner flow path 23 are increased linearly. Such flow rate control is the same as that of the case of the fourth embodiment mentioned above, and performs the same effect as that of the fourth embodiment.

That it is desirable to use the fan 13 during the heat dissipation treatment is also the same as that of the fourth embodiment. Moreover, in this example, a case of using both of the linear control of the output of the pump 14 and the linear control of the opening of the valve 41a together has been explained, but that it is also possible to control the flow rate of the cooling liquid by the linear control of either the pump output or valve opening is also the same as that of the fourth embodiment.

Sixth Embodiment

Figure 15:
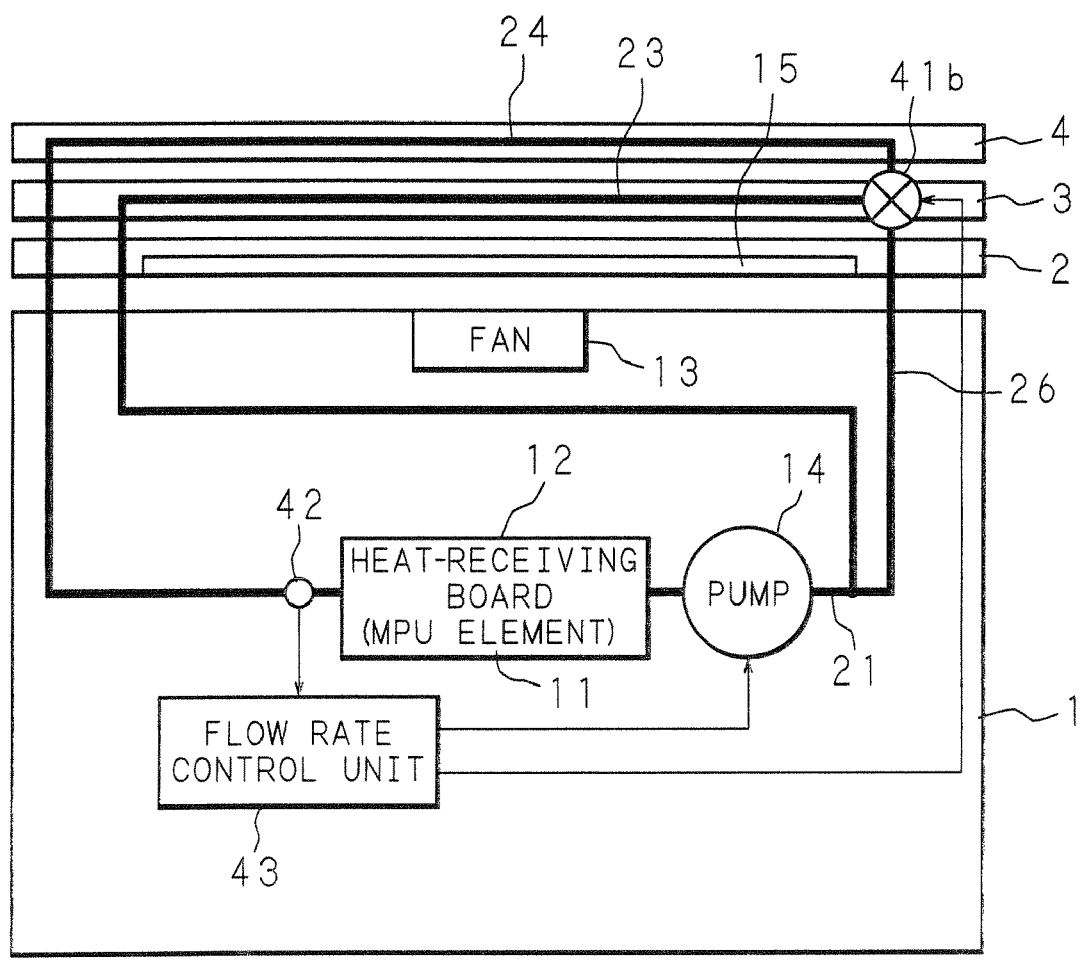
FIG. 15 is a schematic diagram showing a configuration of an electronic apparatus according to a sixth embodiment.

FIG. 15 is a schematic diagram showing a configuration of an electronic apparatus (notebook type computer) of a sixth embodiment. In FIG. 15, the same number is given to a portion the same as or similar to that of FIG. 11. According to the sixth embodiment, the body flow path 21 in the first housing 1 communicates with the inner flow path 23 and the outer flow path 24 formed in the inner heat-dissipating board 3 and the outer heat-dissipating board 4, respectively, in series.

A bypass flow path 26 is formed in a form of branching from a communicating portion between the inner flow path 23 and the outer flow path 24, and connecting to the body flow path 21. In addition, the valve 41b for adjusting a flow rate ratio of the cooling liquid flowing to the inner flow path 23/bypass flow path 26 is provided at the communicating portion between the inner flow path 23 and outer flow path 24. The pump 14 is provided in the middle of the body flow path 21, and the pump 14 drives the cooling liquid to pass through the body flow path 21 and to circulate in the outer flow path 23, the inner flow path 23, and/or the bypass flow path 26 in series.

Moreover, the temperature sensor 42 is provided near the heat-receiving board 12, and the temperature sensor 42 outputs the temperature measurement result to the flow rate control unit 43. The flow rate control unit 43 controls the output of the pump 14 and the opening of the valve 41b based on the temperature measurement result by the temperature sensor 42. The flow rate of the cooling liquid in the inner flow path 23 and the bypass flow path 26 is controlled by opening the valve 41b to either of the inner flow path 23 side or the bypass flow path 26 side.

Then, operation thereof will be explained. The output of the pump 14 and the opening of the valve 41b are adjusted based on the temperature measurement result by the temperature sensor 42, so that the flow rate of the cooling liquid flowing in the outer flow path 24, the inner flow path 23, and the bypass flow path 26 is controlled.

Figure 16:
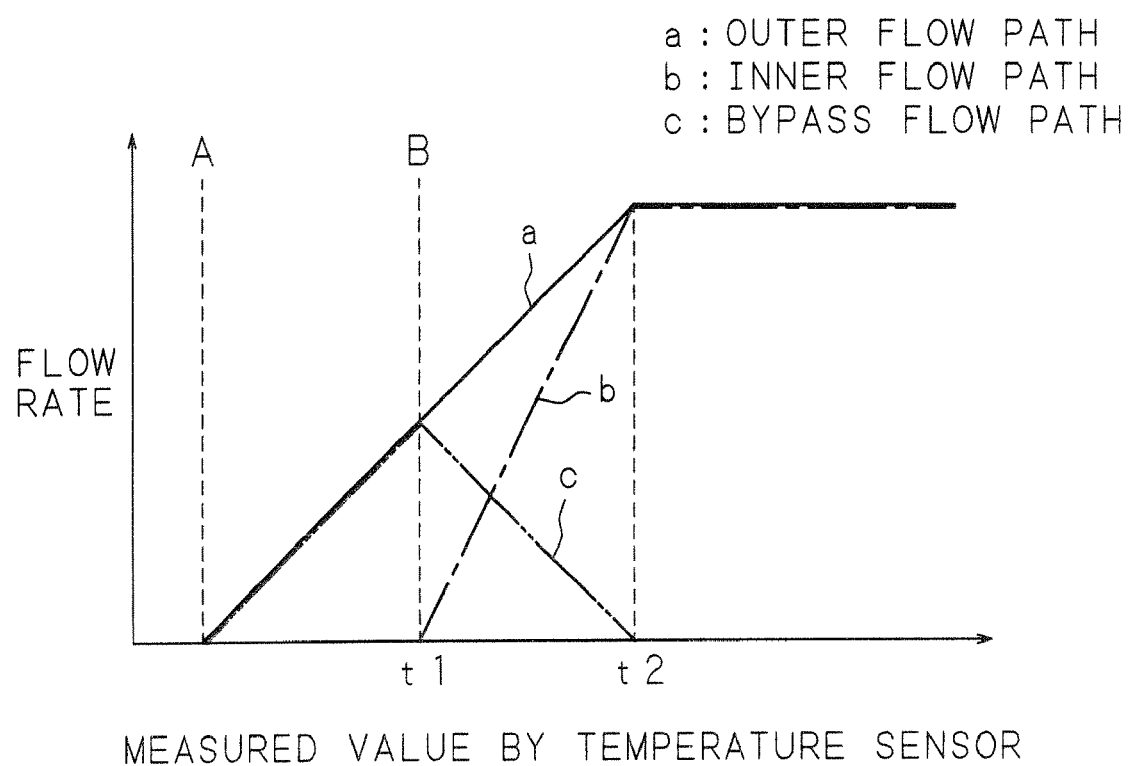
FIG. 16 is a graphic chart showing an example of a flow rate control of a cooling liquid in the electronic apparatus according to the sixth embodiment.

FIG. 16 is a graphic chart showing an example of a relationship between the measured value by the temperature sensor 42, and the flow rate control of the cooling liquid in the outer flow path 24, the inner flow path 23, and the bypass flow path 26. In FIG. 16, a solid line a, an alternate long and short dash line b, and an alternate long and two short dashes line c represent the flow rate of the cooling liquid flowing in the outer flow path 24, the flow rate of the cooling liquid flowing in the inner flow path 23, and the flow rate of the cooling liquid flowing in the bypass flow path 26. Incidentally, in this example, since a series flow path configuration is employed, the flow rate in the outer flow path 24 is equal to that in the body flow path 21. Meanwhile, when the flow rate in the inner flow path 23 increases, the flow rate in the bypass flow path 26 will decrease according to that, At room-temperature (A in FIG. 16), the cooling liquid is made to flow into no flow paths. Until the measured value by the temperature sensor 42 reaches t1 (for example, 55 degrees centigrade) (B in FIG. 16), the valve 41b is opened only to the bypass flow path 26 side, the cooling liquid is made not to flow through the inner flow path 23, and the output of the pump 14 is increased according to the temperature rise, so that the flow rates of the cooling liquid flowing in the outer flow path 24 and the bypass flow path 26 are increased linearly. When the temperature is low, since a sufficient heat dissipation result is obtained only by the heat dissipation treatment from the outer heat-dissipating board 4, the cooling liquid is made not to flow through the inner flow path 23, so that the cooling liquid is returned to the body flow path 21 via the bypass flow path 26.

When the measured value exceeds t1, according to the temperature rise, the valve 41b is gradually opened to the inner flow path 23 side and the output of the pump 14 is increased, so that the flow rates of the cooling liquid flowing in the outer flow path 24 and the inner flow path 23 are increased linearly, and the flow rate of the cooling liquid flowing in the bypass flow path 26 is decreased linearly. When the measured value by the temperature sensor 42 then reaches t2 (for example, 70 degrees centigrade), the flow rates of the cooling liquid in the outer flow path 24 and the inner flow path 23 will be saturated.

Thus, also in the sixth embodiment, the same effect that the excellent heat dissipation effect is obtained and the efficient heat dissipation treatment can be performed according to a temperature situation as that of the fourth embodiment may be performed. Moreover, that it is desirable to use the fan 13 during the heat dissipation treatment is the same as that of the fourth embodiment.

Incidentally, in the fourth through the sixth embodiments mentioned above, the temperature near the MPU element 11 is measured and the flow rate of the cooling liquid is controlled, but it is a matter of course that even when the temperature of the second housing 2, or the temperatures of the inner heat-dissipating board 3 or the outer heat-dissipating board 4 may be measured and the flow rate control may be performed based on that temperature measurement result, the same effect can be obtained. Moreover, in the fourth through the sixth embodiments mentioned above, two or three heat-dissipating boards are provided, but the present invention is similarly applicable even when four or more heat-dissipating boards are provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electronic apparatus having a microprocessor in a main body portion that generates heat and discharging the heat generated in said main body portion to the outside with a cooling liquid, comprising:
    a plurality of heat dissipation portions that have flow paths of the cooling liquid in a mode of communicating with each other in series, the flow paths including an outer flow path and an inner flow path;
    a bypass flow path that branches from a communicating portion between the outer flow path and the inner flow path and that connects to a body flow path in the main body portion;
    a pump that drives the cooling liquid to pass through the body flow path and to circulate in at least one of the outer flow path, the inner flow path and the bypass flow path in series;
    a valve for adjusting a ratio of a flow rate of the cooling liquid flowing through the inner flow path over a flow rate of the cooling liquid flowing through the bypass flow path;
    a measuring unit that measures a temperature about the microprocessor; and
    a control unit that controls an output of the pump and an opening of the valve based on the temperature about the microprocessor by the measuring unit, thereby controlling a flow rate of the cooling liquid flowing through said flow paths in each of said plurality of heat dissipation portions.

2. The electronic apparatus according to claim 1, wherein according to a plurality of predetermined temperatures about the microprocessor based on the measurement result by said measuring unit, a flow rate of the cooling liquid flowing through said flow path in each of said plurality of heat dissipation portions is independently controlled.

* * * * *